United States Patent
Ng et al.

(10) Patent No.: US 10,698,127 B2
(45) Date of Patent: Jun. 30, 2020

(54) LATCH ANTENNA SHIELD FOR DOWNHOLE LOGGING TOOL

(71) Applicant: HALLIBURTON ENERGY SERVICES, INC., Houston, TX (US)

(72) Inventors: Heen Wei Ng, Singapore (SG); Minh Dang Nguyen, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 215 days.

(21) Appl. No.: 15/884,235

(22) Filed: Jan. 30, 2018

(65) Prior Publication Data
US 2019/0235120 A1    Aug. 1, 2019

(51) Int. Cl.
| | | |
|---|---|---|
| *G01V 3/28* | (2006.01) |
| *E21B 49/00* | (2006.01) |
| *H01Q 1/52* | (2006.01) |
| *G01V 13/00* | (2006.01) |
| *G01V 3/30* | (2006.01) |
| *E21B 23/01* | (2006.01) |
| *E21B 17/10* | (2006.01) |
| *E21B 47/01* | (2012.01) |
| *E21B 47/12* | (2012.01) |

(52) U.S. Cl.
CPC ............ *G01V 3/28* (2013.01); *E21B 17/1078* (2013.01); *E21B 23/01* (2013.01); *E21B 47/011* (2013.01); *E21B 49/003* (2013.01); *G01V 3/30* (2013.01); *G01V 13/00* (2013.01); *H01Q 1/523* (2013.01); *E21B 47/12* (2013.01)

(58) Field of Classification Search
CPC . G01V 3/28; G01V 3/30; G01V 13/00; E21B 47/011; E21B 17/1078; E21B 23/01; E21B 49/003; E21B 47/12; H01Q 1/523
See application file for complete search history.

(56) References Cited

U.S. PATENT DOCUMENTS

| 2,577,469 | A | * | 12/1951 | Kumpf | ................. | H01Q 21/062 |
|---|---|---|---|---|---|---|
| | | | | | | 343/813 |
| 3,688,114 | A | * | 8/1972 | Youmans | ............... | G01V 5/105 |
| | | | | | | 376/153 |
| 6,268,726 | B1 | * | 7/2001 | Prammer | ................. | G01V 3/32 |
| | | | | | | 324/303 |

(Continued)

FOREIGN PATENT DOCUMENTS

CN    104384645 A    *    3/2015

*Primary Examiner* — Christopher P McAndrew
*Assistant Examiner* — Zannatul Ferdous (57) ABSTRACT

An antenna shield latches around a mandrel or wellbore tubular to protect an antenna carried by the mandrel. The antenna shield opens to facilitate installation over the mandrel, and closes the around the antenna to provide robust protection from the downhole environment. Radial sections of the antenna shield are coupled to one another such that the antenna shield maintains a one piece construction, and the sections may pivot to move the antenna shield between open and closed configurations. Readily opening and closing the antenna shield facilitates maintenance and repair of the antenna and reusability of the antenna shield. Other components of a logging tool system, e.g., stabilizers, may also be provided with a similar latch mechanism for coupling to an outer diameter of the wellbore tubular.

20 Claims, 5 Drawing Sheets

(56) References Cited

U.S. PATENT DOCUMENTS

| | | | |
|---|---|---|---|
| 2004/0149434 A1* | 8/2004 | Frey | E21B 43/086 |
| | | | 166/250.1 |
| 2011/0074427 A1* | 3/2011 | Wang | G01V 3/30 |
| | | | 324/339 |
| 2015/0061682 A1 | 3/2015 | Homan et al. | |
| 2015/0122480 A1* | 5/2015 | Sullivan | E21B 31/06 |
| | | | 166/66.5 |
| 2016/0327189 A1* | 11/2016 | Schroeder | F16L 33/225 |

* cited by examiner

LATCH ANTENNA SHIELD FOR DOWNHOLE LOGGING TOOL

BACKGROUND

The present disclosure relates generally to wellbore tools, e.g., tools useful in oil and gas exploration and production. More particularly, embodiments of the disclosure relate to tool components, e.g., antenna shields and stabilizer sleeves, which may be installed on a wellbore mandrel or other tubular to circumscribe an outer diameter thereof.

An antenna shield is one type of tool component that is often installed on resistivity tools used in logging-while-drilling (MD) systems, measurement-while-drilling (MWD) systems, wireline logging systems or other systems that employ a downhole antenna for evaluating a geologic formation. These antennae typically use a coil of wire wound around a tubular body, and are generally operable for transmitting or receiving electromagnetic waves passed through the geologic formation. An antenna shield is often installed to circumscribe an outer diameter of the tubular body and the antennae to physically protect the antennae from the downhole environment. Often an antenna shield is constructed of a round ring that may be guided over a longitudinal end the tubular body for installation. This process can be cumbersome, particularly when the antennae are disposed a significant distance from the longitudinal end. Maintenance and repair efforts for the antennae may be prolonged by difficulties in installing or removing the antenna shield.

BRIEF DESCRIPTION OF THE DRAWINGS

The disclosure is described in detail hereinafter, by way of example only, on the basis of examples represented in the accompanying figures, in which.

DETAILED DESCRIPTION

The present disclosure includes an antenna shield that latches around a wellbore tubular to protect an antenna or other sensors carried by the wellbore tubular. The antenna shield opens to facilitate installation at any longitudinal position of the tubular, and closes the around the antenna to provide robust protection from the downhole environment. Sections of the antenna shield are coupled to one another and may pivot to move the antenna shield between open and closed configurations. Readily opening and closing the antenna shield may facilitate maintenance and repair of the antenna or sensors and promote reusability of the antenna shield. The sensors may include EM antennae, acoustic sensors, strain gages and/or other types of transmitters or receivers operable for obtaining a downhole parameter, e.g., a parameter useful in evaluating a geologic formation or other aspects of a downhole operation. Other components of a logging tool system, e.g., stabilizers, may also be provided with a similar latch mechanism for coupling to an outer diameter of the wellbore tubular.

Figure 1:
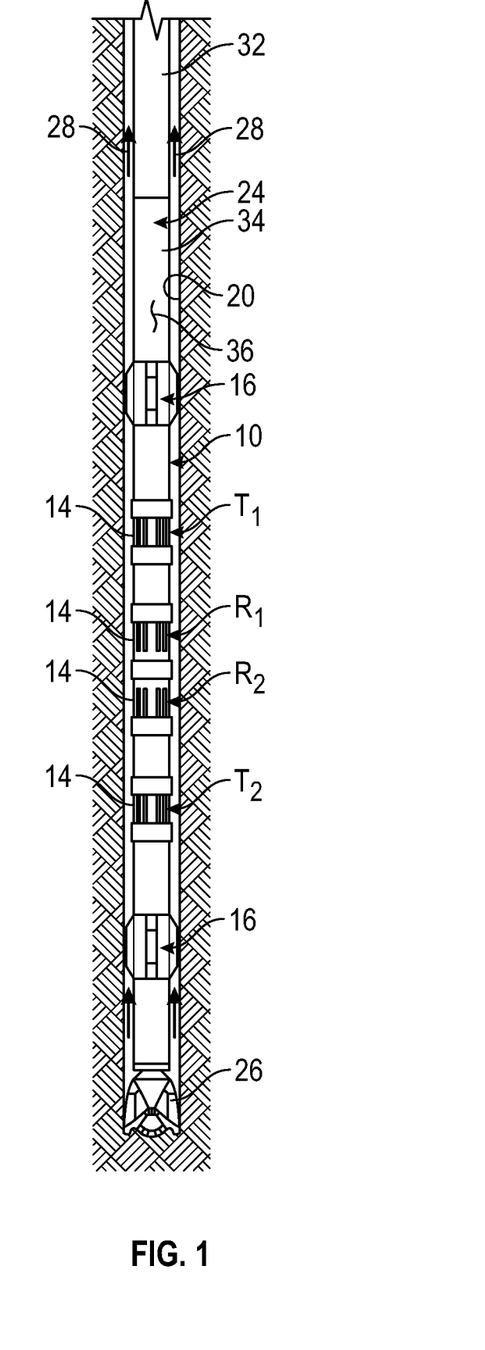
FIG. 1 is a partial cross-sectional side view of a logging tool positioned in a wellbore and illustrating a stabilizer sleeve and a plurality of antenna shields of the present disclosure.

FIG. 1 is a partial cross-sectional side view of a logging tool 10 including plurality of antenna shields 14 and stabilizers 16 of the present disclosure. The logging tool 10 is disposed in a wellbore 20, which may be formed in a geologic formation "G" by rotary drilling or other methods recognized in the art. As illustrated in FIG. 1, the logging tool 10 includes a drill string 24 suspended within the wellbore 20 and having a drill bit 26 at its lowermost end. In other embodiments, a logging tool may be coupled to coiled tubing, a wireline or types of conveyances.

The drill string 24 and the drill bit 26 may be rotated by known means, such as by a conventional rotary table that is positioned on a drilling platform (not shown) positioned over the wellbore 20. Drilling fluid, sometimes referred to herein as "mud," is pumped from the surface down through the drill string 24 and into the borehole 20 to remove cuttings and also to cool and, in some instances, to lubricate the drill bit 26. The drilling fluid exits the bottom of the drill string 24 via ports (not shown) formed in the drill bit 26 and, as represented by arrows 28, circulates back to the top of the borehole 20 in the annular region 30 between the outside of the drill string 14 and the periphery of the borehole 12.

As explained more fully below, logging tool 10 is disposed between drill bit 26 and a drill collar 32, and forms a portion of drill string 24. Although the logging tool 10 of the present invention is not limited to any particular number or type of transmitter or receiver coils, the illustrated embodiment includes two transmitters, shown generally at T1 and T2, and two receivers, generally shown at R1 and R2. Also, although drill string 24 is shown in a substantially vertical orientation in FIG. 1, it will be understood that in directional drilling applications, that portion of drill string 24 which includes logging tool 10 may be positioned in any number of other inclinations, and may even be positioned in a horizontal or substantially horizontal orientation.

The antenna shields 14 and stabilizers 16 of the logging tool 10 are carried by a mandrel 34 connected in the drill string 24. Mandrel 34 defines an outer surface 36 and interconnects drill bit 26 and drill collar 32. The mandrel 34 may be constructed as generally cylindrical wellbore tubular, around which the antenna shields 14 and stabilizers 16 are connected, as described in greater detail below. The antenna shields 14 are disposed about the outer surface 36 of mandrel 34 to seal and to protect the various antenna arrays and electronics packages housed within recesses defined in the mandrel 34. The antenna shields may protect various electrical devices and circuitry necessary for gathering a variety of drilling parameters and desirable formation data and transmitting the collected data to the surface via one of a number of known telemetry means. The mandrel 34 supports the various transmitter and receiver coils 36 (FIG. 3) and associated signal conditioning electronics, and also serves as a conduit for electrical wiring and drilling fluid. The stabilizers 16 include one or more blades 38, which protrude radially from the outer surface 36 of the mandrel 34 to stabilize and guide the logging tool in the wellbore 20.

Figure 2:
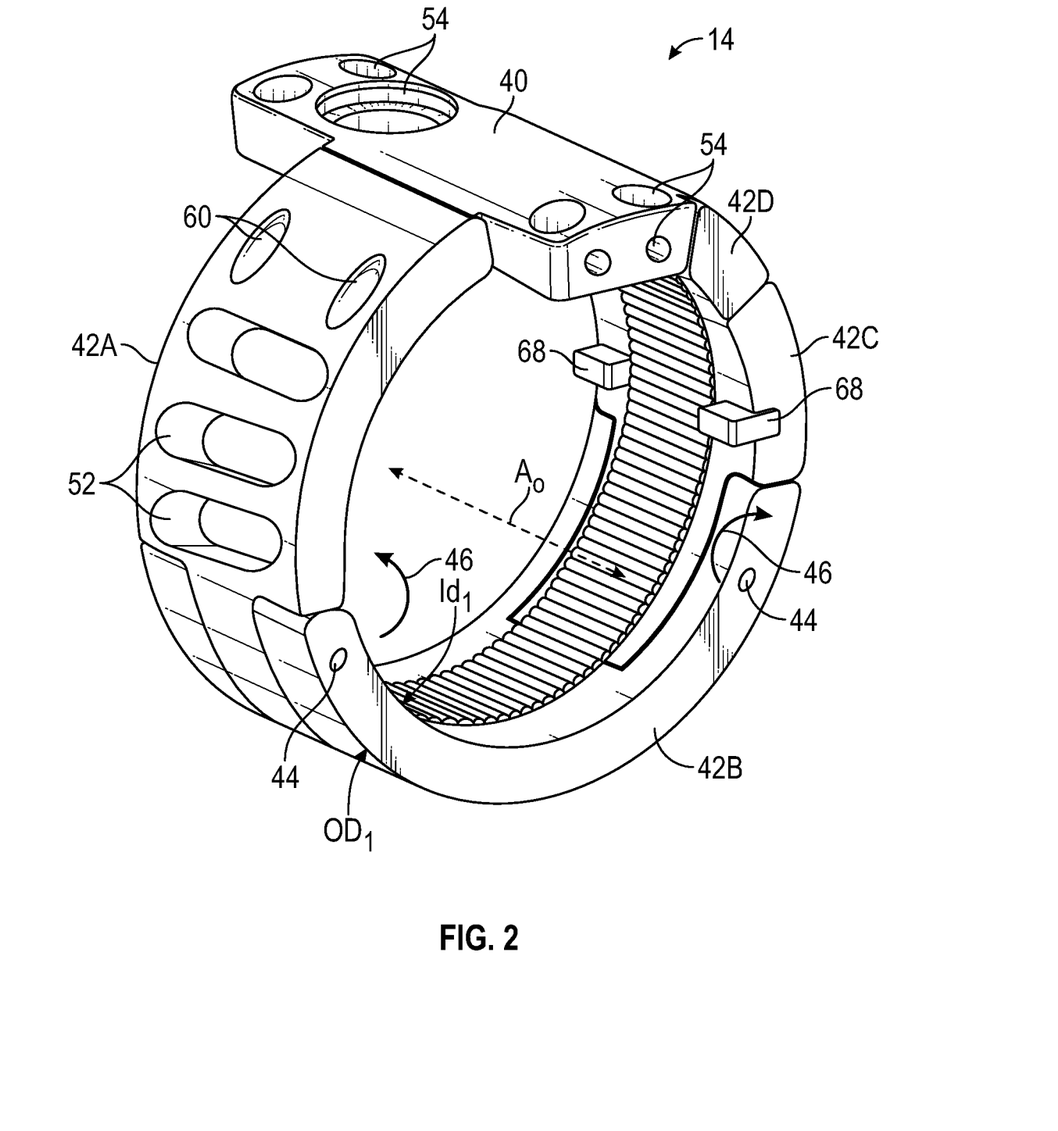
FIG. 2 is a perspective view of one of the antenna shields of FIG. 1 illustrating a closed configuration for the antenna shield.

Referring to FIG. 2, an antenna shield 14 is illustrated a closed configuration. The antenna shield 14 is generally constructed of a junction bar 40 and a plurality of radial sections 42A, 42B, 42C and 42D (collectively or generally sections 42). The junction bar 40 and the radial sections 42 are movably coupled to one another such that the antenna shield 14 maintains a generally one-piece construction as the antenna shield 14 moves from the closed configuration illustrated in FIG. 2 and an open configuration (see FIG. 3A). A pair of pivot pins 44 is defined through radial section 42B to permit radial sections 42A and 42C to pivot with respect to radial section 42B. The pivot pins 44 are generally parallel to a longitudinal axis $A_0$ of the antenna shields 14 such that sections 42A and 42C pivot in the directions of arrows 46. The pivot pins 44 are disposed between an inner $ID_1$ and outer diameter $OD_1$ of the antenna shield 14 such that the pivot pins 44 do not protrude radially from the antenna shield, thereby reducing a risk of interference with other wellbore components in operation. Although two pivot pins 44 are illustrated in FIG. 2, in other embodiments, more or fewer radial sections may be pivotally connected to one another (see, e.g., FIG. 4).

The junction bar 40 and the sections 42 may be constructed of any suitable material that provides sufficient mechanical protection without distorting and/or over-attenuating the transmitted and/or received electromagnetic waves. In some embodiments, the junction bar 40 and/or sections 42 are constructed of steel or other metallic materials, and in other embodiments, plastic, synthetic or composite materials may be selected. In some embodiments, exterior surfaces of the junction bar 40 and sections 42 may comprise hard coating surfaces, e.g., hard anodizing, physical vapor deposition (PVD) coatings, etc. to enhance the durability of the antenna shield 14. In some embodiments, windows 52 may be defined within one or more of the sections 42 and/or junction bar 40, which may increase the ability of electromagnetic waves to pass through the antenna shield. 14.

The junction bar 40 includes a plurality of openings 54 defined therein, which may provide wiring paths for coupling a sensor or antenna 58 (FIG. 3A) to other antennae, processing circuitry, memory, or other components of a logging tool 10 (FIG. 1). For example, a sensor or antenna 58 may be coupled by wires extending through the openings 54 to a processor (not shown). The processor may receive an indication of the downhole parameters obtained by the sensor or antenna 58 through the wires, and analyze the parameters to evaluate a geologic formation or another downhole condition. In some embodiments (not shown), the openings 54 may house processors, circuit boards, sensors or other components of a logging tool 10.

Section 42A includes a plurality of generally tangentially-oriented bores 60 that extend therethrough. The bores 60 may accommodate set screws 62 (FIG. 3B) or other fasteners to secure section 42A to the junction bar 40, and thereby retain the antenna shield 14 in the closed configuration. Section 42C includes a pair of keys 68 protruding radially inwardly. The keys 68 cooperate with keyhole openings 70 (FIG. 3A) defined in the mandrel 34 absorb torsional loads, and maintain the antenna shield 14 in a fixed orientation around the mandrel 34.

Figure 3A:
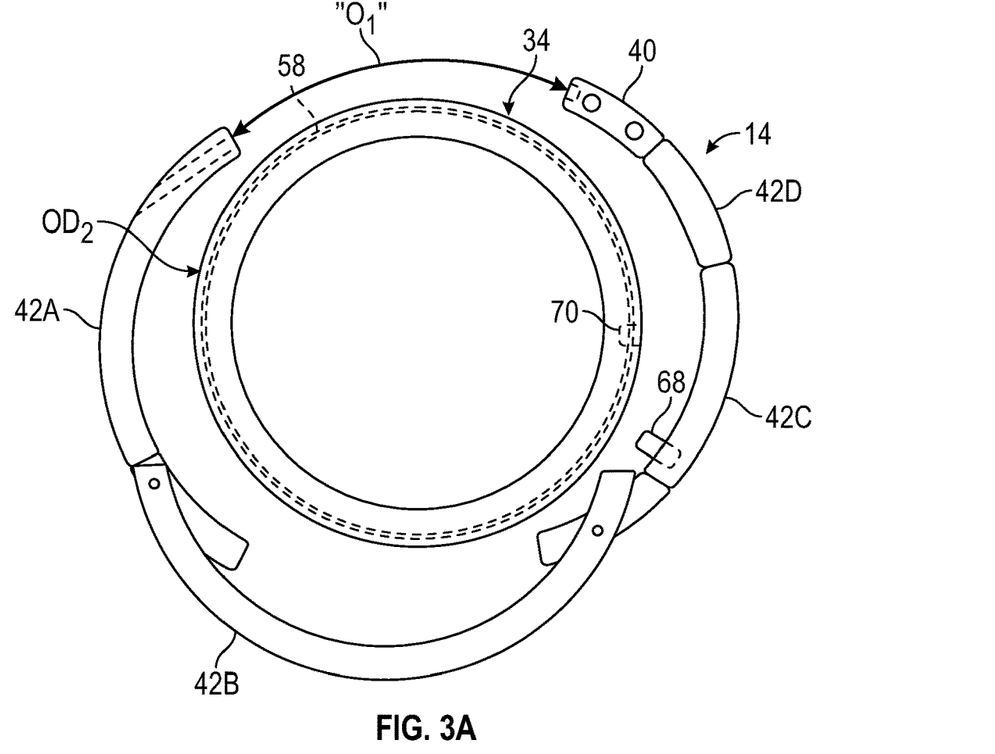
FIG. 3A is an end view of the antenna shield of FIGS. 1 and 2, illustrating an open configuration for the antenna shield, which facilitates installation of the antenna shield on an outside diameter of a mandrel from any longitudinal position along the mandrel.

Referring to FIG. 3A, an end view of the antenna shield 14 is illustrated in an open configuration, which facilitates installation of the antenna shield 14 around the outside surface 36 of the mandrel 34. In the open configuration, the antenna shield moves freely around the mandrel 34. As illustrated in FIG. 3A, the mandrel 34 carries antenna 58 within a recess or groove defined radially within the outer surface 36 of mandrel 34. The antenna 58 may include any coil or other assembly for transmitting or receiving electromagnetic waves passed through a geologic formation "G" (FIG. 1) for detecting a formation parameter useful in evaluating the geologic formation. The antenna 58 may be arranged above, below, around or between keyhole openings 70 such that the neither the keyhole openings nor the keys 68 interfere with the antenna 58 in operation.

The antenna 58 may be operable for detecting a formation parameter such as resistivity, dielectric constant, water saturation, porosity, density and permeability. In other embodiments, the antenna shield 14 may be arranged around other sensors for detecting other downhole parameters such as geophysical acoustic velocity, density, pressure, pH level, etc. The antenna 58 or other sensor may transmit an indication of the detected parameter to a processor, which may be carried by a logging tool 10 (FIG. 1) or disposed at a surface location. The processor may be configured to receive the indications of the parameters and generate information useful in evaluating the geologic formation or downhole condition. For example, the processor may generate mathematical models or maps for estimating or predicting drilling or production conditions.

The antenna shield 14 may be positioned in one piece to circumscribe the antenna 58 and thereby protect the antenna 58. In the open configuration illustrated, the sections 42A and 42C of the antenna shield 14 are pivoted with respect to section 42B. Section 42D and the junction bar 40 may be rigidly coupled to the section 42C and may pivot along with section 42C. A circumferential opening "$O_1$" is defined in the antenna shield 14 between the junction bar 40 and the section 42A. The circumferential opening "$O_1$" may be sufficiently wide, e.g., wider than an outer diameter $OD_2$ of the mandrel, in some embodiments to permit the antenna shield 14 to be wrapped around the mandrel 34 at any longitudinal position of the mandrel 34. In these embodiments, it is not necessary to guide the antenna shield over at longitudinal end of the mandrel 34.

Figure 3B:
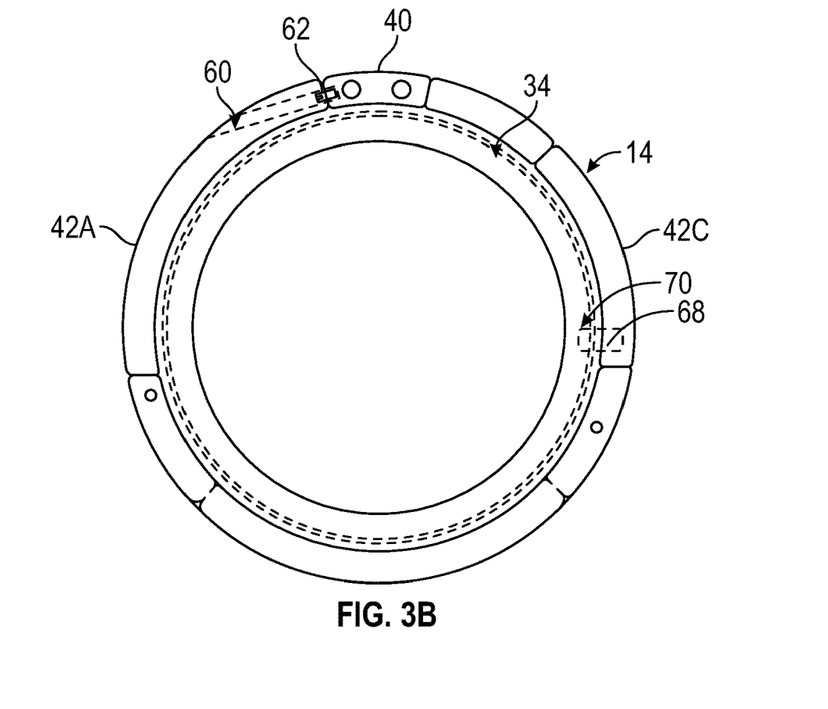
FIG. 3B is an end view of the antenna shield of FIG. 3A, illustrating the closed configuration of the antenna shield installed on the mandrel.

Referring to FIG. 3B, the antenna shield 14 is illustrated in the closed configuration around the mandrel 34. In the closed configuration, the antenna shield 14 engages the mandrel to fix a position of the antenna shield about the antenna. The sections 42A and 42C are pivoted radially inwardly such that section 42A abuts the junction bar 40. Set screws 62 or other fasteners are installed within the tangentially-oriented bores 60 to maintain antenna shield in the closed configuration. The keys 68 extend into the keyhole openings 70 to maintain the circumferential orientation of the antenna shield 14 around the mandrel 34. In some embodiments, an epoxy may be installed over and around the antenna shield 14 to seal the antenna 58 from drilling fluids in operation.

The antenna shield 14 may be installed, removed and re-installed on the mandrel 34. The amount of epoxy may be reduced due to the one-piece construction of the antenna shield and removal and reinstallation of the antenna shield 14 may be achieved at a rig site in some instances. Maintenance of the antenna 58 is thereby facilitated.

Figure 4:
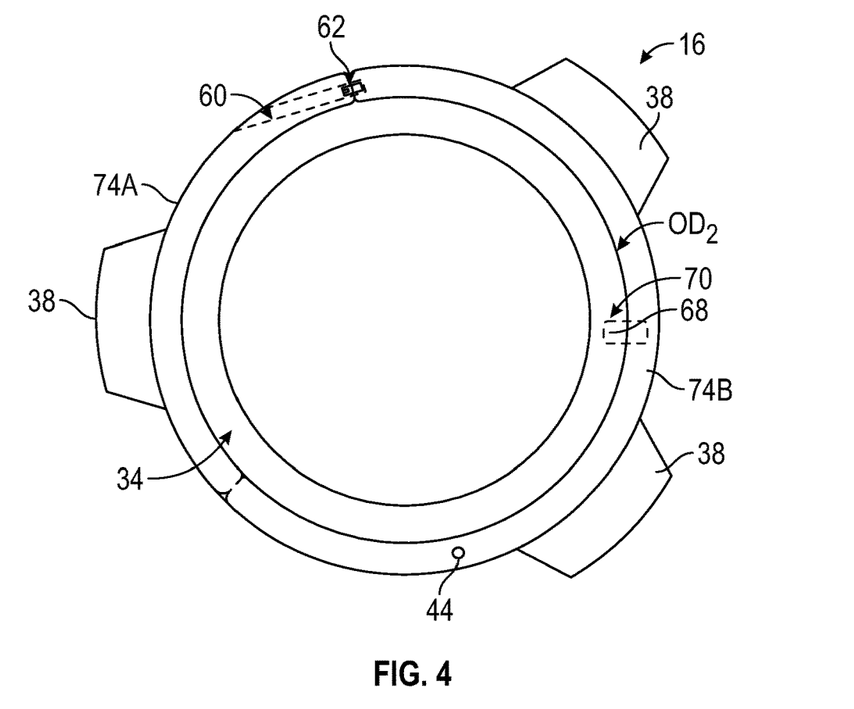
FIG. 4 is an end view of a stabilizer sleeve of the present disclosure illustrating a closed configuration of the stabilizer sleeve, which facilitates installation of the stabilizer sleeve on an outside diameter of the wellbore tubular.

Referring to FIG. 4, an end view of a stabilizer 16 of the present disclosure is illustrated in a closed configuration on an outside diameter OD2 of the mandrel 34. The stabilizer 16 includes a plurality of sections 74A, 74B that are pivotally coupled to one another by a pivot pin 44. The sections 74A and 74B include one or more radially-spaced blades 38 extending radially outward for engaging a geologic formation "G" (FIG. 1). Set screws or fasteners 62 are installed within tangentially-oriented bores 60 defined in the sections 74A and 74B to maintain the stabilizer 16 in the closed configuration, and keys 68 extend into the keyhole openings 70 to maintain the circumferential orientation of the stabilizer 14 around the mandrel 34. Similar to the antenna shield 14 (FIG. 3A) described above, the stabilizer 16 may be moved to an open configuration to define a circumferential opening. By removing the set screws or fasteners 62 and pivoting the sections 74A and 74B about the pivot pin 44, the stabilizer can be moved to an open configuration to facilitate installation and removal of the stabilizer from the mandrel 34.

Figure 5:
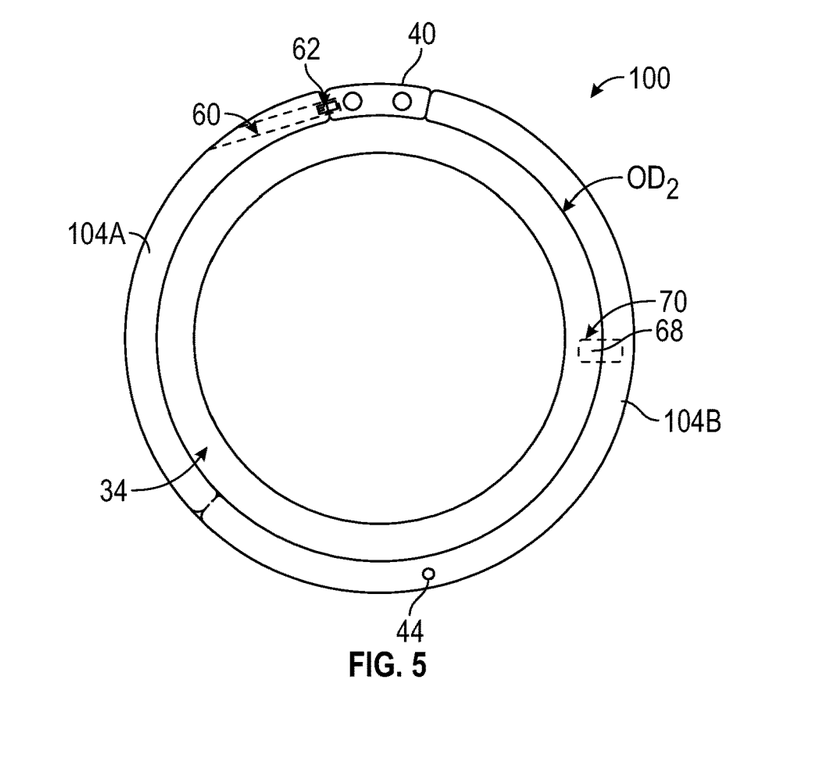
FIG. 5 is an end view of an alternate embodiment of an antenna shield of the present disclosure illustrating a single pivot to permit the antenna shield to move between open and closed configurations.

Referring to FIG. 5, an end view of an alternate embodiment of an antenna shield 100 of the present disclosure illustrates a single pivot pin 44 to permit the antenna shield 100 to move between open and closed configurations. The antenna shield 100 includes a junction bar 40 and a plurality of sections 104A, 104B that are pivotally coupled to one another by a pivot pin 44. The sections 104A and 104B are illustrated in the closed configuration around the outside diameter $OD_2$ of the mandrel 34. The section 104A abuts the junction bar 40 such that set screws or fasteners 62 may be installed within tangentially-oriented bores 60 to couple the section 104A to the junction bar 40. Again, keys 68 extend into the keyhole openings 70 to maintain the circumferential orientation of the antenna shield around the mandrel 34. Similar to the antenna shield 14 (FIG. 3A) and stabilizer 16 (FIG. 4) described above, the antenna shield 100 may be moved to an open configuration to define a circumferential opening. By removing the set screws or fasteners 62 and pivoting the sections 104A and 104B about the pivot pin 44, the antenna shield 100 can be moved to an open configuration to facilitate installation and removal of the antenna shield 100 from the mandrel 34.

Figure 6A:
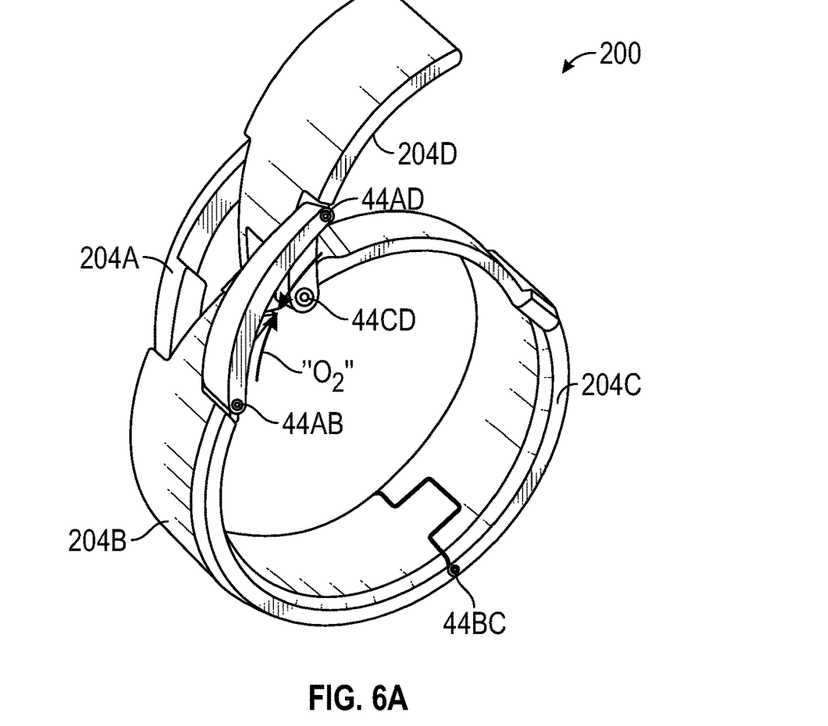
FIGS. 6A and 6B are perspective views of open and closed configurations respectively of an alternate embodiment of an antenna shield of the present disclosure for installation from a longitudinal end of a mandrel.

Referring to FIG. 6A, a perspective view of an alternate embodiment of an antenna shield 200 of the present disclosure is illustrated. Antenna shield 200 is arranged for installation from a longitudinal end of a mandrel 34 (FIG. 1) in the open configuration illustrated. Antenna shield 200 includes a plurality of sections 204A, 204B, 204C and 204D (generally 204) pivotally coupled to one another by pivot pins 44. Section 204A is pivotally coupled to both section 204B and also 204D. A pivot pin 44CD coupling sections 204C and 204D is arranged circumferentially between a pivot pin 44AB coupling sections 204A and 204B and a pivot pin 44AD coupling sections 204A and 204D. The pivot pins 44 and the sections 204 are thus generally arranged as an over center linkage to permit the antenna shield 200 to maintain a closed configuration (see FIG. 6B) without the need for fasteners or other retaining mechanisms.

Figure 6B:
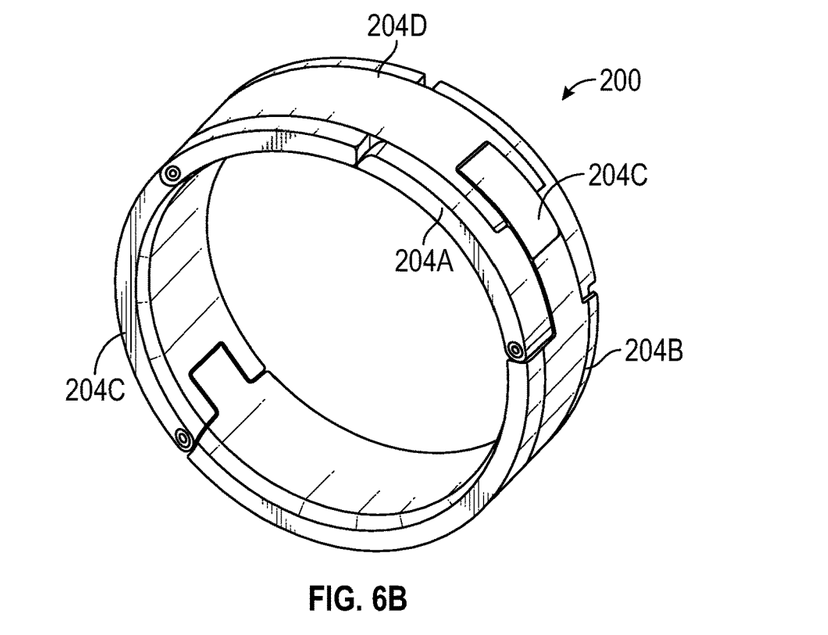

The over center linkage may be characterized by the pivot pin 44AD moving from a first circumferential side of the pivot pin 44CD in the open configuration to a second opposite circumferential side of the pivot pin 44CD in the closed configuration (see FIG. 6B).

The circumferential opening "$O_2$" defined between sections 204B and 204C is limited, and section 240A circumferentially overlaps the circumferential opening "$O_2$." Thus, the antenna shield 200 may not be as readily installed over any longitudinal point of the mandrel 34 (FIG. 3A) as the antenna shield 14. However, in the open configuration, the sections 204 of the antenna shield 200 are relatively loosely coupled to one another, and sufficient slack may exist to permit the antenna shield 200 to be readily guided over a longitudinal end of the mandrel 34.

Referring to FIG. 6B, the antenna shield 200 is illustrated in the closed configuration. The section 204D is pivoted down toward section 204C. The sections 204 may thereby be drawn taught, and no set screws or fasteners are necessary to maintain the antenna shield 200 in the closed configuration. Although not shown, fasteners may be provided, e.g., between sections 204D and 204C to redundantly maintain the antenna shield 200 in the closed configuration. Also, in some embodiments, an antenna shield similar to antenna shield 200 may also be provided with keys 68 (see FIG. 2) to facilitate maintaining a circumferential position on a mandrel, and windows 52 may also be provided without departing from the scope of the disclosure.

The aspects of the disclosure described below are provided to describe a selection of concepts in a simplified form that are described in greater detail above. This section is not intended to identify key features or essential features of the claimed subject matter, nor is it intended to be used as an aid in determining the scope of the claimed subject matter.

In one aspect, the disclosure is directed to a well logging apparatus. The well logging apparatus includes a mandrel operable for connection in a drill string and defining a recess therein. A sensor is disposed within the recess. The sensor is operable for detecting a downhole parameter. An antenna shield circumscribes the antenna. The antenna shield includes a plurality of radial sections movably coupled to one another such that the antenna shield may be moved from an open configuration wherein the antenna shield moves freely around the mandrel, and a closed configuration wherein the antenna shield engages the mandrel to fix a position of the antenna shield about the sensor.

In some embodiments, the sensor includes an antenna that is operable for transmitting or receiving electromagnetic waves passed through a geologic formation for evaluating the geologic formation. In one or more example embodiments, the plurality of radial sections are pivotally coupled to one another. The apparatus may further include one or more pivot pins radially disposed between an inner diameter and an outer diameter of the antenna shield such that the one or more pivot pins do not protrude radially from the antenna shield. In some embodiments, the apparatus includes one or more pivot pins coupling the radial sections to one another, and a first one of the pivot pins may be arranged on a first circumferential side of a second one of the pivot pins in the open configuration and arranged on a second circumferential side of the second pivot pin in the closed configuration. In one or more example embodiments, the antenna shield defines a circumferential opening in the open configuration, and the circumferential opening may be wider than an outer diameter of the mandrel.

In one or more example embodiments, the apparatus further includes a junction bar coupled circumferentially between the radial sections. The junction bar may include a plurality of openings therein through which wiring is routed for electrically coupling the sensor to other components of the well logging apparatus. The apparatus may further include at least one fastener coupling the junction bar to one of the radial sections to maintain the antenna shield in the closed configuration.

In some embodiments, the apparatus further includes windows extending through the radial sections, at least one key protruding radially inwardly from the at least one of the radial sections, and at least one keyhole opening defined in the mandrel for receiving the at least one key. In some embodiments, the apparatus further includes a stabilizer coupled around the mandrel, the stabilizer including a plurality of radial sections movably coupled to one another between open and closed configurations.

In another aspect, the disclosure is directed to a well logging system. The system includes a conveyance extending into a wellbore, and a mandrel coupled to the conveyance and an antenna carried by the mandrel. The antenna is operable for transmitting or receiving electromagnetic waves passed through a geologic formation for detecting a formation parameter, e.g., a parameter useful in evaluating the geologic formation. The system further includes an antenna shield circumscribing the antenna. The antenna shield includes a plurality of radial sections movably coupled to one another such that the antenna shield may be moved from an open configuration wherein the antenna shield moves freely around the mandrel, and a closed configuration wherein the antenna shield engages the mandrel to fix a position of the antenna shield about the antenna.

In one or more example embodiments, the system further includes a drill bit coupled at a lower end of the mandrel and wherein the conveyance includes a drill collar therein. In some embodiments, the antenna includes a coil antenna arranged for measuring a resistivity of the geologic formation. The antenna shield may include a plurality of windows extending therethrough.

In another aspect, the disclosure is directed to a method for installing an antenna shield on a well logging apparatus. The method includes (a) moving the antenna shield to an open configuration by moving a plurality of coupled radial sections with respect to one another while maintaining a one piece construction of the antenna shield, (b) moving the antenna shield in the open configuration over a mandrel to a location of an antenna carried by the mandrel, and (c) moving the antenna shield to a closed configuration over the mandrel to circumscribe the antenna by moving the coupled radial sections with respect to one another.

In one or more example embodiments, the method further includes installing at least one fastener between at least one of the radial sections and a junction bar to maintain the antenna shield in the closed configuration. In some embodiments, the method further includes sealing the antenna on the mandrel by applying an epoxy about the antenna shield.

In some embodiments, moving the antenna shield to a closed configuration includes pivoting the coupled radial sections with respect to one another. Pivoting the coupled radial sections with respect to one another may include moving a first pivot pin from a first circumferential side of a second pivot pin to a second circumferential side of the second pivot pin. In one or more example embodiments, the method further includes moving the antenna to the open configuration to remove the antenna shield from the mandrel, and reinstalling the antenna shield on the mandrel by moving the antenna shield to the closed configuration.

The Abstract of the disclosure is solely for providing the United States Patent and Trademark Office and the public at large with a way by which to determine quickly from a cursory reading the nature and gist of technical disclosure, and it represents solely one or more examples.

While various examples have been illustrated in detail, the disclosure is not limited to the examples shown. Modifications and adaptations of the above examples may occur to those skilled in the art. Such modifications and adaptations are in the scope of the disclosure.

What is claimed is:

1. A well logging apparatus, comprising:
a mandrel operable for connection in a drill string, the mandrel defining a recess therein;
a sensor disposed within the recess, the sensor operable for detecting a downhole parameter;
a one piece antenna shield circumscribing the sensor, the antenna shield including a plurality of radial sections movably coupled to one another such that the antenna shield may be moved from an open configuration wherein the radial sections are moved to a radially outward position with respect to the mandrel such that the antenna shield defines a first diameter and moves freely around the mandrel, and a closed configuration wherein the radial sections are moved to a radially inward position with respect to the mandrel such that the antenna shield defines a second diameter less than the first diameter and engages the mandrel to fix a position of the antenna shield about the sensor and maintain the antenna shield around the mandrel.

2. The apparatus of claim 1, wherein the plurality of radial sections are pivotally coupled to one another.

3. The apparatus of claim 2, further comprising one or more pivot pins radially disposed between an inner diameter and an outer diameter of the antenna shield such that the one or more pivot pins do not protrude radially from the antenna shield.

4. The apparatus of claim 2, further comprising one or more pivot pins coupling the radial sections to one another, and wherein a first one of the pivot pins is arranged on a first circumferential side of a second one of the pivot pins in the open configuration and arranged on a second circumferential side of the second pivot pin in the closed configuration.

5. The apparatus of claim 2, wherein the antenna shield defines a circumferential opening in the open configuration, and wherein the circumferential opening is wider than an outer diameter of the mandrel.

6. The apparatus of claim 1, further comprising a junction bar coupled circumferentially between the radial sections, the junction bar including a plurality of openings therein through which wiring is routed for electrically coupling the sensor to other components of the well logging apparatus.

7. The apparatus according to 6, further comprising at least one fastener coupling the junction bar to one of the radial sections to maintain the antenna shield in the closed configuration.

8. The apparatus according to claim 1, further comprising windows extending through the radial sections.

9. The apparatus according to claim 1, further comprising at least one key protruding radially inwardly from the at least one of the radial sections, and at least one keyhole opening defined in the mandrel for receiving the at least one key.

10. The apparatus according to claim 1, further comprising a stabilizer coupled around the mandrel, the stabilizer including a plurality of radial sections movably coupled to one another between open and closed configurations.

11. A well logging system, comprising:
a conveyance extending into a wellbore;
a mandrel coupled to the conveyance;
an antenna carried by the mandrel, the antenna operable for transmitting or receiving electromagnetic waves passed through a geologic formation for detecting a formation parameter; and
a one piece antenna shield circumscribing the antenna, the antenna shield including a plurality of radial sections movably coupled to one another such that the antenna shield may be moved from an open configuration wherein the radial sections are moved to a radially outward position with respect to the mandrel such that the antenna shield defines a first diameter and moves freely around the mandrel, and a closed configuration wherein the radial sections are moved to a radially inward position with respect to the mandrel such that the antenna shield defines a second diameter less than the first diameter and engages the mandrel to fix a position of the antenna shield about the antenna and maintain the antenna shield around the mandrel.

12. The system according to claim 11, further comprising a drill bit coupled at a lower end of the mandrel and wherein the conveyance includes a drill collar therein.

13. The system according to claim 11, wherein the antenna comprises a coil antenna arranged for measuring a resistivity of the geologic formation.

14. The system according to claim 13, wherein the antenna shield comprises a plurality of windows extending therethrough.

15. A method for installing an antenna shield on a well logging apparatus, the method comprising:
moving the antenna shield to an open configuration by moving a plurality of movably coupled radial sections radially outwardly with respect to one another to define a circumferential opening in the antenna shield while maintaining a one piece construction of the antenna shield;
moving the antenna shield in the open configuration over a mandrel to a location of an antenna carried by the mandrel; and
moving the antenna shield to a closed configuration over the mandrel to circumscribe the antenna and maintain the antenna shield around the mandrel by moving the movably coupled radial sections radially inwardly with respect to one another to close the circumferential opening defined in the antenna shield while maintaining a one piece construction of the antenna shield.

16. The method according to claim 15, further comprising installing at least one fastener between at least one of the radial sections and a junction bar to maintain the antenna shield in the closed configuration.

17. The method according to claim 15, further comprising sealing the antenna on the mandrel by applying an epoxy about the antenna shield.

18. The method according to claim 15, wherein moving the antenna shield to a closed configuration comprises pivoting the coupled radial sections with respect to one another.

19. The method according to claim 18, wherein pivoting the coupled radial sections with respect to one another comprises moving a first pivot pin from a first circumferential side of a second pivot pin to a second circumferential side of the second pivot pin.

20. The method according to claim 15, further comprising moving the antenna to the open configuration to remove the antenna shield from the mandrel, and reinstalling the antenna shield on the mandrel by moving the antenna shield to the closed configuration.

* * * * *

UNITED STATES PATENT AND TRADEMARK OFFICE
CERTIFICATE OF CORRECTION

PATENT NO. : 10,698,127 B2
APPLICATION NO. : 15/884235
DATED : June 30, 2020
INVENTOR(S) : Heen Wei Ng and Minh Dang Nguyen Page 1 of 1

It is certified that error appears in the above-identified patent and that said Letters Patent is hereby corrected as shown below:

In the Specification

Column 1, Line 14, change "MD" to -- LWD --

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*